(12) United States Patent
Maier

(10) Patent No.: US 8,402,820 B2
(45) Date of Patent: Mar. 26, 2013

(54) DIAGNOSIS CONCEPT FOR VALVE CONTROLLED COOLANT BYPASS PATHS

(75) Inventor: Oliver Maier, Worms (DE)

(73) Assignee: GM Global Technology Operations LLC, Detroit, MI (US)

( * ) Notice: Subject to any disclaimer, the term of this patent is extended or adjusted under 35 U.S.C. 154(b) by 412 days.

(21) Appl. No.: 12/728,816

(22) Filed: Mar. 22, 2010

(65) Prior Publication Data

US 2011/0226048 A1  Sep. 22, 2011

(51) Int. Cl.
*G01M 17/00* (2006.01)
(52) U.S. Cl. .................................... 73/114.68
(58) Field of Classification Search ............... 73/114.68, 73/114.77
See application file for complete search history.

(56) References Cited

U.S. PATENT DOCUMENTS 7,762,080 B2 * 7/2010 Anson et al. ............... 60/772
2010/0115959 A1 * 5/2010 Anson et al. ............... 60/772

* cited by examiner

*Primary Examiner* — Eric S McCall
(74) *Attorney, Agent, or Firm* — John A. Miller; Miller IP Group, PLC

(57) ABSTRACT

A system and method for determining whether a shut-off valve in a cabin heating by-pass line of a thermal sub-system associated with an engine has failed that uses the pump current for a pump that pumps the cooling fluid through the by-pass line. The method includes setting a predetermined constant speed of the pump and then providing a valve command that opens the by-pass valve. The method then determines if the pump current has increased or remained substantially the same when the by-pass valve is commanded open, and determines that the by-pass valve has not opened if the pump current remains substantially constant when the by-pass valve is commanded open.

18 Claims, 2 Drawing Sheets

DIAGNOSIS CONCEPT FOR VALVE CONTROLLED COOLANT BYPASS PATHS

BACKGROUND OF THE INVENTION

1. Field of the Invention

This invention relates generally to a system and method for determining whether a shut-off valve is operating properly and, more particularly, to a system and method for determining whether a shut-off valve that directs a cooling fluid flowing in a fuel cell system is operating properly by determining whether a pump current for a pump that pumps the cooling fluid indicates that the valve is closed.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work can act to operate a vehicle.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For the automotive fuel cell stack mentioned above, the stack may include two hundred or more individual cells. The fuel cell stack receives a cathode reactant gas, typically a flow of air forced through the stack by a compressor. Not all of the oxygen is consumed by the stack and some of the air is output as a cathode exhaust gas that may include liquid water and/or water vapor as a stack by-product. The fuel cell stack also receives an anode hydrogen reactant gas that flows into the anode side of the stack.

It is necessary that a fuel cell stack operate at an optimum relative humidity and temperature to provide efficient stack operation and durability. A typical stack operating temperature for automotive applications is about 80° C. The stack temperature provides the relative humidity within the fuel cells in the stack for a particular stack pressure. Excessive stack temperatures above the optimum temperature may damage fuel cell components and reduce the lifetime of the fuel cells. Also, stack temperatures below the optimum temperature reduces the stack performance. Therefore, fuel cell systems employ thermal sub-systems that control the temperature within the fuel cell stack to maintain a thermal equilibrium.

A typical thermal sub-system for an automotive fuel cell system includes a radiator, a fan and a pump. The pump pumps a cooling fluid, such as water and glycol mixture, through cooling fluid channels within the fuel cell stack where the cooling fluid collects the stack waste heat. The cooling fluid is directed through a pipe or hose from the stack to the radiator where it is cooled by ambient air either forced through the radiator from movement of the vehicle or by operation of the fan. Because of the high demand of radiator airflow to reject a large amount of waste heat to provide a relatively low operating temperature, the fan is usually powerful and the radiator is relatively large. The physical size of the radiator and the power of the fan have to be higher compared to those of an internal combustion engine of similar power rating because of the lower operating temperature of the fuel cell system and the fact that only a comparably small amount of heat is rejected through the cathode exhaust in the fuel cell system.

The cooling fluid that is pumped through the fuel cell stack is generally also used to provide cabin heating for the passenger compartment of the vehicle. In order to provide such heating, an auxiliary loop off of the main coolant loop is provided that directs the cooling fluid to a cabin heater core that uses the heat from the cooling fluid to distribute heated air to the vehicle cabin. The cabin heater core is provided within a climate control module within the cabin of the vehicle. An electrical heater is typically provided in the auxiliary loop to raise the temperature of the cooling fluid to a temperature suitable for providing cabin heating. The heater core operates as a heat exchanger that receives the heated cooling fluid and causes air flowing therethrough to be heated. A shut-off valve is provided in the auxiliary loop that can either be opened or closed depending on whether cabin heating is desired. When the valve is open, the cooling fluid is provided to the cabin heater core to provide the heating and when the valve is closed, the cooling fluid is not available to the cabin heater core.

The shut-off valve is typically an inexpensive valve that may be susceptible to failure. If the valve is stuck in a closed position and a command is given to open the valve, the electrical heater or other components, may be damaged because the cooling fluid is not available to remove the heat. Because the shut-off valve is typically inexpensive, there is no feedback provided from the valve indicating whether it is actually opened or closed in response to a command.

Sensors and switches can be provided in and around the cabin electrical heater to detect the temperature, and switch off the electrical heater in the event that the temperature is too high, possibly because the valve has failed. However, these components and devices add cost and weight to the system, where it is desirable to eliminate the components. Additionally, the wiring harnesses and connectors that are required to be coupled to the sensors also add cost and complexity to the system. Typically, the sensors will need to be coupled directly to the electrical heater to determine whether overheating has occurred.

SUMMARY OF THE INVENTION

In accordance with the teachings of the present invention, a system and method are disclosed for determining whether a shut-off valve in a cabin heating by-pass line of a thermal sub-system associated with an engine has failed that uses the pump current for a pump that pumps the cooling fluid through the by-pass line. The method includes setting a predetermined constant speed of the pump and then providing a valve command that opens the by-pass valve. The method then determines if the pump current has increased or remained substantially constant when the by-pass valve is commanded open, and determines that the by-pass valve has not opened if the pump current remains substantially constant when the by-pass valve is commanded open.

DETAILED DESCRIPTION OF THE EMBODIMENTS

The following discussion of the embodiments of the invention directed to a system and method for determining whether a cabin heating by-pass valve is opened or closed based on electrical pump current is merely exemplary in nature, and is in no way intended to limit the invention or its application or uses. For example, the discussion herein refers to a thermal sub-system for a fuel cell system. However, as will be appreciated by those skilled in the art, the system and method of the invention may have an application to other types of systems, including other systems for vehicles, including internal combustion engine vehicles.

Figure 1:
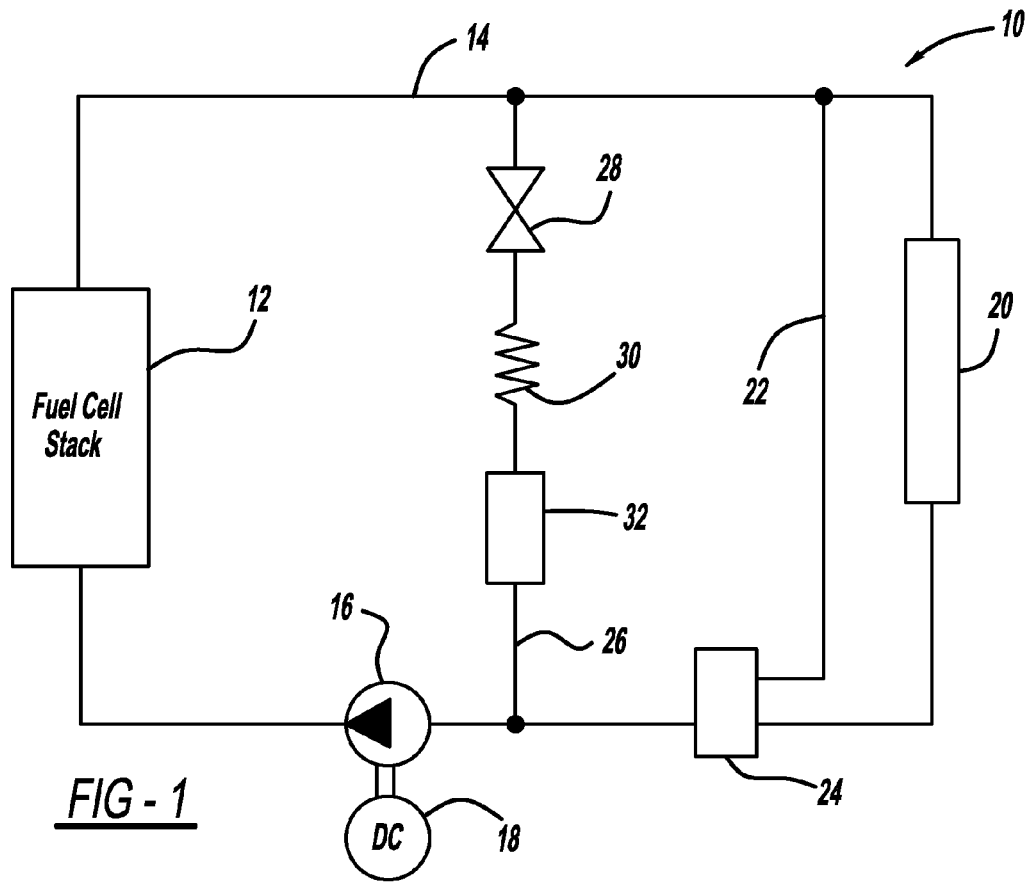
FIG. 1 is a schematic block diagram of a thermal sub-system of a fuel cell system.

FIG. 1 is a schematic diagram of a fuel cell system 10 including a fuel cell stack 12. Although this discussion is specific to a fuel cell system, the technique described in detail below for determining whether a cabin heater by-pass valve has failed is not limited to a fuel cell system, but may be applicable to other types of vehicles that employ cabin heating, such as internal combustion engine vehicles. The fuel cell system 10 includes a thermal sub-system having a coolant loop 14 through which a cooling fluid flows external to the stack 12. The cooling fluid can be any cooling fluid suitable for the purposes described herein, many of which are well known to those skilled in the art. A pump 16 pumps the cooling fluid through the coolant loop 14 and through cooling fluid flow channels within the fuel cell stack 12. The pump 16 is an electrical pump driven by a DC motor 18, and can specifically be an electrical/proportional cooling fluid pump, although other types of electrical pumps may be applicable.

The pump 16 pumps the cooling fluid through the coolant loop 14 and through a radiator 20 that reduces the temperature of the cooling fluid before it is returned to the fuel cell stack 12 to pick up more waste heat. The radiator 20 can be any radiator suitable for the purposes described herein, such as a radiator that receives a cooling air forced through the radiator by a fan (not shown). The fan can selectively control how much cooling is provided to the cooling fluid by the radiator 20. Further, a by-pass line 22 is provided around the radiator 20 where the cooling fluid flowing through the by-pass line 22 and/or the radiator 20 is controlled by a proportional by-pass valve 24. For low temperature operation, the valve 24 can cause the cooling fluid flow to completely by-pass the radiator 20 so that the cooling fluid is heated up to the operating temperature of the fuel cell stack 12 more quickly, and during operation of the fuel cell system 10, can selectively control the amount of cooling fluid that flows through the radiator 20 and around the radiator 20 on the by-pass line 22 to further help control the temperature of the cooling fluid in conjunction with the speed of the pump 16 and the cooling provided by the radiator 20.

The cooling fluid can also be used to provide heat for a heat exchanger that heats the cabin or passenger compartment of the vehicle. Particularly, the cooling fluid can be selectively sent through a cabin heater by-pass line 26 that is controlled by a shut-off valve 28. The shut-off valve 28 is an open/closed valve where the cooling fluid is either provided through the by-pass line 26 or not. An electrical heater 30 in the by-pass line, such as a resistive heater, heats the cooling fluid in the by-pass line 26 to increase its temperature above the operating temperature of the fuel cell stack 12 to provide increased cabin heating. The heated cooling fluid in the by-pass line 26 is then sent to a cabin heater core 32 that operates as a heat exchanger that uses the heated cooling fluid to heat air that is blown into the passenger compartment in a manner that is well understood by those skilled in the art. If cabin heating is not desired, then the valve 28 is closed so that cabin heating is not available and the electrical heater 30 is shut off.

As discussed above, the valve 28 may fail and be stuck in a closed position even though a command to open the valve 28 has been given. For the type of valves used in these types of thermal sub-systems, there is no way of telling whether the valve 28 has malfunctioned, and as a result, the electric heater 30 may be turned on with no cooling fluid flow to the heater 30, which may cause damage to various components. Sensors may be provided in conjunction with the electric heater 30, but these sensors and the electrical wiring associated therewith add significant cost to the system. The present invention proposes a technique for determining whether the valve 28 is stuck in a closed position by looking at the pump current in the motor 18. Particularly, the resistance of the fluid flow through the coolant loop 14 and the by-pass line 26 will be lower when the valve 28 is open, which will cause the pump current to increase for the same pump speed.

Figure 2:
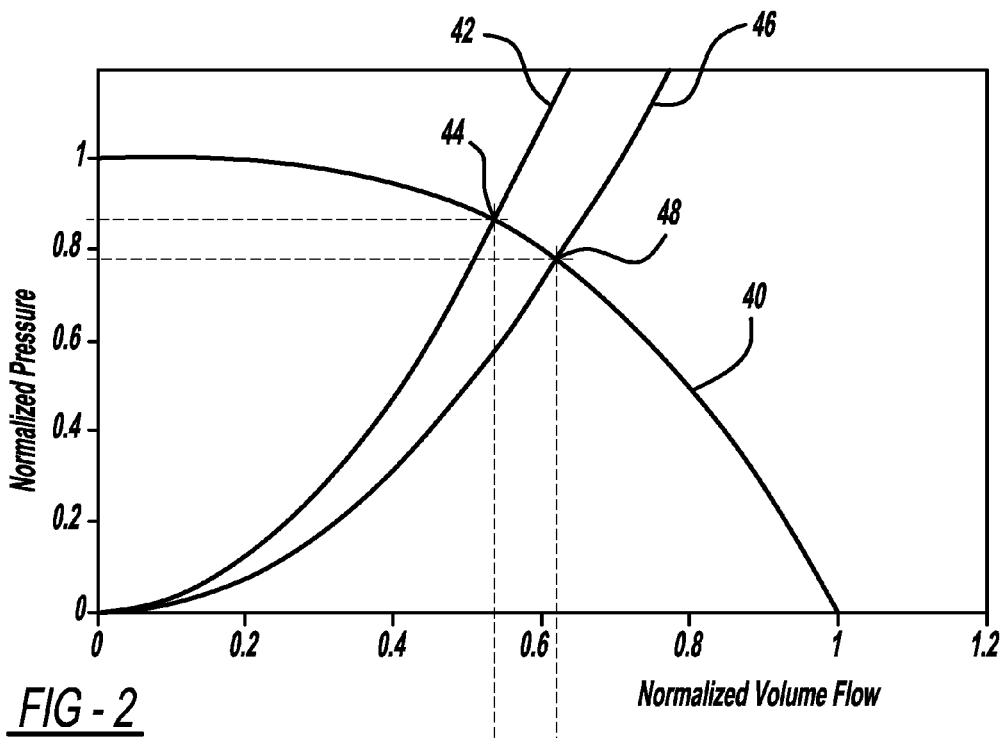
FIG. 2 is a graph with volume flow on the horizontal axis and pressure on the vertical axis showing system characteristics and a pump map line when a by-pass valve is closed and when the by-pass valve is open.
Figure 3:
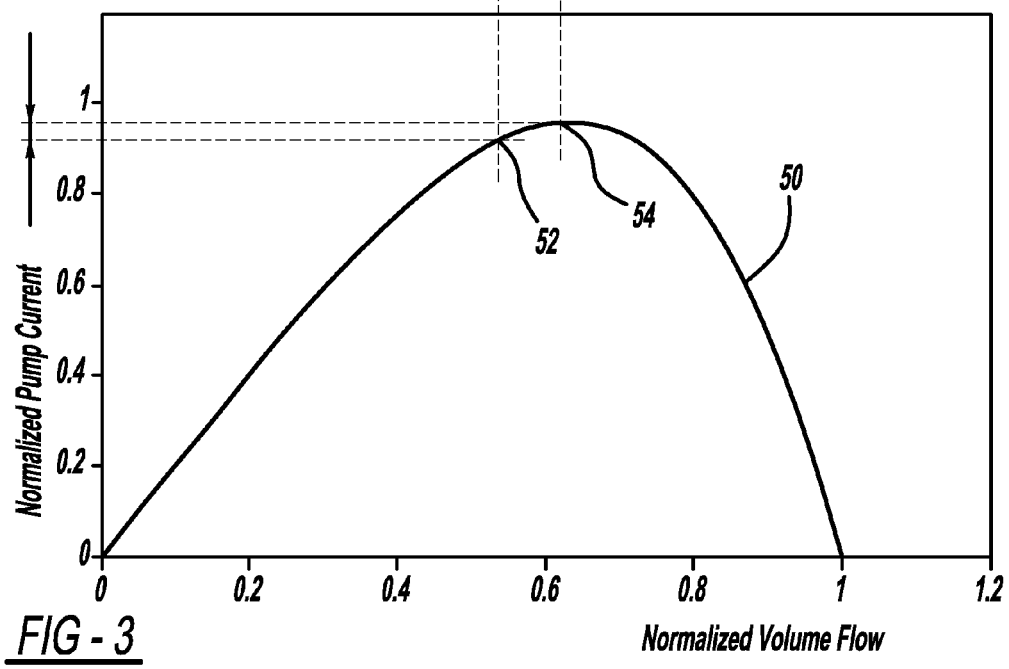
FIG. 3 is a graph with volume flow on the horizontal axis and current on the vertical axis showing a relationship between pump current and the system characteristics of the graph in FIG. 2 when the by-pass valve is closed and when the by-pass valve is open.

FIGS. 2 and 3 are graphs that show system relationships employed in the present invention to determine whether the valve 28 is opened or closed. FIG. 2 includes normalized volume flow of the cooling fluid on the horizontal axis and normalized pressure within the coolant loop 14 on the vertical axis. Graph line 40 represents a pump map line that illustrates the relationship between the pressure in the coolant loop 14 and the volume flow through the pump 16 for pump operation at a constant pump speed. Graph line 42 represents the thermal sub-system characteristic curve between the thermal sub-system pressure and cooling fluid volume flow when the by-pass valve 28 is closed. The sub-system characteristics considers all of the flow paths and components through which the cooling fluid flows, as discussed above in the system 10, when the cooling fluid does not flow through the by-pass line 26. The intersection between the curves 42 and 40 at point 44 identifies the location on the pump map that the pump 16 operates when the by-pass valve 28 is closed.

When the by-pass valve 28 is open, the total pressure in the thermal sub-system and the coolant loop 14 decreases because there is less resistance to the flow of the cooling fluid through the coolant loop 14, and now the by-pass line 26. Because there is less resistance to the cooling fluid flow in the thermal sub-system with the by-pass valve 28 in the open position, the system characteristic curve moves to line 46, where the intersection between the characteristic curve 46 and the pump map curve 40 is at point 48. Thus, there is an increase in the flow volume of the cooling fluid at the lower pressure.

FIG. 3 shows normalized volume flow on the horizontal axis and normalized pump current on the vertical axis, where graph line 50 represents the pump characteristic curve at a constant pump speed for the relationship between these values. When the by-pass valve 28 is closed, the pump current will be at point 52 for that system pressure. When the by-pass valve 28 is opened, then the pump current operates at point 54 for the lower pressure and lower resistance.

When the by-pass valve 28 is opened or closed, and the flow resistance changes, the pump current provided by the motor 18 is adjusted so that the speed of the pump 16, and thus the volume flow of the cooling fluid, remains constant. Therefore, if a command is given to open the by-pass valve 28, which would lower the flow resistance in response to a decrease in total pressure, the current applied to the pump 16 should increase in response thereto. Thus, if a command is given to open the by-pass valve 28 for a particular pump speed, and the pump current does not increase, then the system knows that the valve 28 did not open in response to the command.

Figure 4:
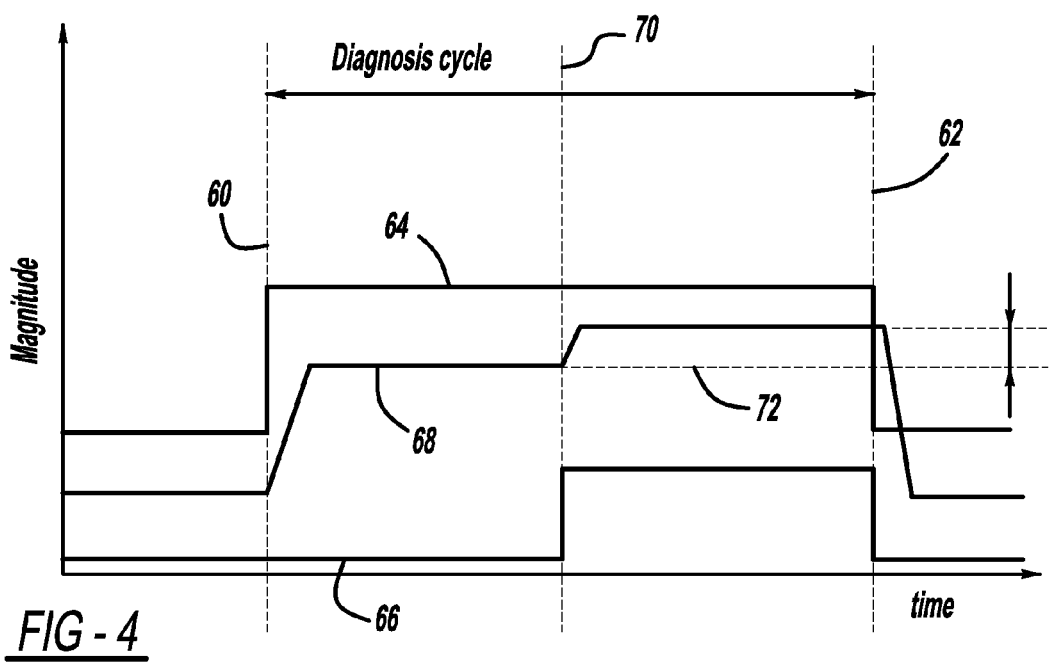
FIG. 4 is a graph with time on the horizontal axis and magnitude on the vertical axis showing a relationship between pump speed, pump current and valve command.

The above described relationships can be used as a diagnostic tool to determine if the by-pass valve 28 is operating properly, as illustrated by the graph at FIG. 4, where time is on the horizontal axis and magnitude is on the vertical axis. The determination of whether the by-pass valve 28 is operating properly is provided during a diagnosis cycle between times identified by lines 60 and 62. At time 60, a diagnostic command causes the pump speed to be increased to a certain and constant value shown by line 64. At this time, the by-pass valve 28 is closed as shown by valve command line 66. When the pump speed is increased, the pump current also increases, as shown by pump current line 68. At a certain time identified by line 70, the by-pass valve 28 is commanded open as shown by valve command line 66. If the by-pass valve 28 is operating properly, the lower resistance in the thermal sub-system as a result of including the by-pass line 26 causes the pump current to increase to maintain the constant pump speed and volume flow. Therefore, if the pump current does not increase at time 70, represented by line 72, then the diagnostic tool knows that the by-pass valve 28 has not opened even though the open command has been given. Before the valve 28 is command open at time 70, the pump current value for the particular pump speed is stored so that it can be compared to the pump current after time 70. If the difference between the pump current before and after time 70 does not exceed a predetermined threshold, then the system will set a diagnostic flag indicating that the by-pass valve 20 has failed, and will not turn on the heater 30.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining whether a by-pass valve has failed, said method comprising:
    providing a power source;
    pumping a cooling fluid through the power source and a coolant loop external to the power source using an electrical pump;
    providing a by-pass line in the coolant loop that includes the by-pass valve;
    controlling the position of the by-pass valve to allow the cooling fluid to flow through the by-pass line or not flow through the by-pass line;
    setting a predetermined constant speed of the pump;
    providing a valve command that opens the by-pass valve after the pump speed has been set;
    determining if a pump current has increased or remained substantially constant after the by-pass valve is commanded open; and
    determining that the by-pass valve has not opened if the pump current remains substantially constant when the by-pass valve is commanded open.

2. The method according to claim 1 wherein the by-pass line directs the cooling fluid to a heater.

3. The method according to claim 2 wherein the heater heats the cooling fluid to heat a cabin of a vehicle.

4. The method according to claim 2 wherein the heater is a resistive heater.

5. The method according to claim 1 wherein setting a predetermined constant speed of the pump includes increasing the speed of the pump to the constant speed.

6. The method according to claim 1 wherein determining if a pump current has increased or remained substantially constant includes comparing the pump current after the by-pass valve is commanded open to a stored pump current before the by-pass valve is commanded open and determining if the difference between the pump currents exceeds a predetermined threshold.

7. The method according to claim 1 wherein the power source is a fuel cell stack.

8. The method according to claim 1 wherein the power source is an internal combustion engine.

9. A method for determining whether a valve that selectively provides a cooling fluid flow to an electric cabin heater in a vehicle has failed, said method comprising:
    providing a valve command that opens the valve; and
    determining that the valve has not opened in response to the valve command if a pump current for a pump that pumps the cooling fluid through the valve remains substantially constant when the valve is commanded open, wherein the valve is in a by-pass line associated with a coolant loop that directs a cooling fluid to a power source on the vehicle.

10. The method according to claim 9 wherein the power source is a fuel cell stack.

11. The method according to claim 9 wherein the power source is an internal combustion engine.

12. The method according to claim 9 further comprising setting a predetermined constant speed of the pump by increasing the speed of the pump before the valve is commanded open.

13. The method according to claim 9 further comprising storing a pump current before the valve is commanded open, wherein determining that the valve has not opened includes comparing the storage pump current to the pump current after the valve was commanded open.

14. The method according to claim 9 wherein the heater is a resistive heater.

15. A method for determining whether a by-pass valve in a by-pass line has failed, said by-pass line being part of a coolant loop that directs a cooling fluid through a fuel cell stack and a line external to the fuel cell stack that is pumped by an electrical pump, said by-pass line directing the cooling fluid to a cabin heater when the by-pass valve is open, said method comprising:
    setting a predetermined constant speed of the pump;

storing a pump current value after the pump speed has been set;

providing a valve command that opens the by-pass valve after the pump speed has been set and the pump current value has been stored;

determining if the pump current has increased or remained substantially constant after the by-pass valve is commanded open by comparing the pump current to the stored pump current value; and determining that the by-pass valve has not opened if the pump current remains substantially constant when the by-pass valve is commanded open.

16. The method according to claim 15 wherein setting a predetermined constant speed of the pump includes increasing the speed of the pump to the constant speed.

17. The method according to claim 15 wherein the heater is a resistive heater.

18. A method for determining whether a valve that selectively provides a cooling fluid flow to an electric cabin heater in a vehicle has failed, said method comprising:

providing a valve command that opens the valve;

determining that the valve has not opened in response to the valve command if a pump current for a pump that pumps the cooling fluid through the valve remains substantially constant when the valve is commanded open; and setting a predetermined constant speed of the pump by increasing the speed of the pump before the valve is commanded open.

* * * * *